United States Patent
Miller

(10) Patent No.: US 10,220,409 B2
(45) Date of Patent: Mar. 5, 2019

(54) METHODS AND SYSTEMS FOR INCREASING SURFACE SMOOTHNESS OF THREE-DIMENSIONAL PRINTED ARTICLE

(71) Applicant: EMPIRE TECHNOLOGY DEVELOPMENT LLC, Wilmington, DE (US)

(72) Inventor: Seth Adrian Miller, Englewood, CO (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 307 days.

(21) Appl. No.: 15/107,927

(22) PCT Filed: Apr. 15, 2014

(86) PCT No.: PCT/US2014/034253
§ 371 (c)(1),
(2) Date: Jun. 24, 2016

(87) PCT Pub. No.: WO2015/160335
PCT Pub. Date: Oct. 22, 2015

(65) Prior Publication Data
US 2017/0028432 A1 Feb. 2, 2017

(51) Int. Cl.
*B05C 9/12* (2006.01)
*B05D 1/36* (2006.01)
(Continued)

(52) U.S. Cl.
CPC ............ *B05D 1/18* (2013.01); *B05C 3/05* (2013.01); *B05C 9/12* (2013.01); *B05C 9/14* (2013.01);
(Continued)

(58) Field of Classification Search
CPC ............ B05C 9/12; B05C 9/14; B05D 1/36
See application file for complete search history.

(56) References Cited

U.S. PATENT DOCUMENTS

| 4,943,496 A | * | 7/1990 | Okada | B22F 3/114 |
| | | | | 427/115 |
| 6,589,603 B1 | * | 7/2003 | Cornell | B05D 5/083 |
| | | | | 427/294 |

(Continued)

FOREIGN PATENT DOCUMENTS

| CN | 103205107 A | 7/2013 |
| WO | 0134371 A2 | 5/2001 |

(Continued)

OTHER PUBLICATIONS

Layer by Layer Deposition of Polyelectrolyte-Polyelectrolyte Complexes for Multilayer Film Fabrication. Langmuir 2009. Co. 25, pp. 1004-1010 (Year: 2009).*

(Continued)

*Primary Examiner* — Cachet I Sellman

(57) ABSTRACT

Technologies are generally described to increase a surface smoothness of a 3D printed article implementing a water-based treatment using layer by layer (LBL) deposition. An initial 3D printed article having an anionic surface may be treated with a first aqueous solution comprising at least one polycation that may bind to the anionic surface to produce a first treated surface, which may be rinsed with water to remove the first aqueous solution. The first treated surface may be treated with a second aqueous solution comprising at least one anionic microparticle that may bind to the polycation to produce a final 3D printed article having a second treated surface, which may be rinsed with water to remove the second aqueous solution. The bound polycation and anionic microparticle may be present as a single layer in (Continued)

the final 3D printed article that may act as a conformal coating to increase the surface smoothness.

8 Claims, 8 Drawing Sheets

(51) Int. Cl.
| | | |
|---|---|---|
| B05D 1/18 | (2006.01) | |
| B29C 71/00 | (2006.01) | |
| B33Y 40/00 | (2015.01) | |
| B05D 5/00 | (2006.01) | |
| B05D 7/00 | (2006.01) | |
| B05C 3/05 | (2006.01) | |
| B05C 9/14 | (2006.01) | |
| B05D 1/38 | (2006.01) | |
| B05D 3/00 | (2006.01) | |
| B05D 3/02 | (2006.01) | |
| B29C 64/35 | (2017.01) | |
| B05D 7/02 | (2006.01) | |
| B08B 3/12 | (2006.01) | |
| C08J 7/04 | (2006.01) | |

(52) U.S. Cl.
CPC ............... *B05D 1/38* (2013.01); *B05D 3/007* (2013.01); *B05D 3/0254* (2013.01); *B05D 5/00* (2013.01); *B05D 7/00* (2013.01); *B05D 7/02* (2013.01); *B05D 7/542* (2013.01); *B08B 3/12* (2013.01); *B29C 64/35* (2017.08); *B29C 71/0009* (2013.01); *B33Y 40/00* (2014.12); *C08J 7/042* (2013.01); *B05D 1/36* (2013.01); *B05D 7/52* (2013.01); *B05D 7/56* (2013.01); *B29C 2071/0018* (2013.01); *C08J 2425/06* (2013.01); *C08J 2433/10* (2013.01); *C08J 2439/02* (2013.01); *C08J 2475/04* (2013.01); *C08J 2479/02* (2013.01); *C08J 2479/04* (2013.01)

(56) References Cited

U.S. PATENT DOCUMENTS

| | | | | |
|---|---|---|---|---|
| 6,596,224 | B1* | 7/2003 | Sachs | B22F 3/008 |
| | | | | 264/113 |
| 6,782,303 | B1* | 8/2004 | Fong | B29C 67/0059 |
| | | | | 700/118 |
| 7,220,452 | B2 | 5/2007 | Hammond Cunningham et al. | |
| 7,795,349 | B2* | 9/2010 | Bredt | B33Y 70/00 |
| | | | | 156/284 |
| 2005/0003189 | A1 | 1/2005 | Bredt et al. | |
| 2005/0093208 | A1* | 5/2005 | Boyd | B29C 67/0059 |
| | | | | 264/442 |
| 2006/0208388 | A1* | 9/2006 | Bredt | B29C 67/0081 |
| | | | | 264/123 |
| 2008/0169585 | A1* | 7/2008 | Zinniel | B29C 71/0009 |
| | | | | 264/401 |
| 2012/0027837 | A1 | 2/2012 | DeMuth et al. | |
| 2013/0095446 | A1* | 4/2013 | Andreiko | A61C 7/08 |
| | | | | 433/6 |
| 2015/0091200 | A1* | 4/2015 | Mech | B33Y 10/00 |
| | | | | 264/40.7 |
| 2015/0368481 | A1* | 12/2015 | Zhu | C09D 5/1162 |
| | | | | 524/549 |

FOREIGN PATENT DOCUMENTS

| | | |
|---|---|---|
| WO | 2008030474 A2 | 3/2008 |
| WO | 2014059269 A2 | 4/2014 |

OTHER PUBLICATIONS

Dubas et al. Swelling and Smoothing of Polyelectrolyte Multilayers by Salt. Langmuir 15 (25) pp. 7725-7727. 2001 (Year: 2001).*
Extended European Search Report for European Application No. EP 14889450.4 dated Oct. 27, 2017, pp. 7.
"Plasti Dip Protective Coating Products," accessed at https://web.archive.org/web/20140410185140/http://www.plastidip.com/home_solutions/Plasti_Dip, accessed on Jun. 20, 2016, pp. 2.
"Polyurethane—waterborne 2K dispersion," accessed at https://web.archive.org/web/20150306090951/http://www.payercoatings.com/bms/db-rsc/bms_rsc_cas.nsf/id/COEN_PUR_PAC_PEX_Disp_for 2K_Systems, accessed on Jun. 20, 2016, pp. 2.
"Smoothing FDM Parts," accessed at https://web.archive.org/web/20131220074203/http://www.stratasys.com/applications/finishing/smoothing-fdm-parts, accessed on Jun. 20, 2016, pp. 3.
Flaherty, J., "Slick Trick Adds Much-Needed Shine to 3-D Printed Parts," accessed at https://web.archive.org/web/20140317094816/http://www.wired.com/design/2013/03/3d-print-smoothing, posted on Mar. 2, 2013, pp. 4.
International Search Report and Written Opinion for International Application No. PCT/US2014/034253 dated Aug. 29, 2014.
Kim, Y.H., et al., "Selective Assembly of Colloidal Particles on a Nanostructured Template Coated with Polyelectrolyte Multilayers," Advanced Materials, vol. 19, Issue 24, pp. 4426-4430 (Dec. 2007).
Kim, Y.H., et al., "Spontaneous surface flattening via layer-by-layer assembly of interdiffusing polyelectrolyte multilayers," Langmuir, vol. 26, Issue 22, pp. 17756-17763 (Nov. 16, 2010).
Ngo, Y.H., et al., "Paper surfaces functionalized by nanoparticles," Advances in colloid and interface science, vol. 163, Issue 1, pp. 23-38 (Mar. 15, 2011).

* cited by examiner

COMPUTER PROGRAM PRODUCT 800

SIGNAL-BEARING MEDIUM 802

804 ONE OR MORE INSTRUCTIONS TO

PROVIDE AN INITIAL 3D PRINTED ARTICLE HAVING AN ANIONIC SURFACE;
TREAT THE ANIONIC SURFACE WITH A FIRST AQUEOUS SOLUTION COMPRISING AT LEAST ONE POLYCATION THAT BINDS TO THE ANIONIC SURFACE TO PRODUCE A FIRST TREATED SURFACE;
RINSE THE FIRST TREATED SURFACE WITH WATER TO REMOVE THE FIRST AQUEOUS SOLUTION;
TREAT THE FIRST TREATED SURFACE WITH A SECOND AQUEOUS SOLUTION COMPRISING AT LEAST ONE ANIONIC MICROPARTICLE THAT BINDS TO THE POLYCATION TO PRODUCE A FINAL 3D PRINTED ARTICLE HAVING A SECOND TREATED SURFACE; AND
RINSE THE SECOND TREATED SURFACE WITH WATER TO REMOVE THE SECOND AQUEOUS SOLUTION.

| COMPUTER-READABLE MEDIUM 806 | RECORDABLE MEDIUM 808 | COMMUNICATIONS MEDIUM 810 |

FIG. 8

METHODS AND SYSTEMS FOR INCREASING SURFACE SMOOTHNESS OF THREE-DIMENSIONAL PRINTED ARTICLE

BACKGROUND

Unless otherwise indicated herein, the materials described in this section are not prior art to the claims in this application and are not admitted to be prior art by inclusion in this section.

Three-dimensional (3D) printing is becoming a popular method to create prototypes and custom manufactured articles. A surface of an article manufactured using 3D printing methods may include a pattern of ridges, which reflect one or more filament or powder layers used to construct the article. Further processing may be performed to achieve a smooth finish on the surface of the 3D printed article using one or more techniques. For example, the article may be physically sanded to achieve the smooth finish, however 3D printed articles may be difficult to sand due to arbitrary topology of the articles, and sanding involves more time and labor. In another example, solvent processing may be performed on the article, where the article is placed in a solvent based soak which may cause an outermost layer of the object to swell and subsequently allow the solvent to slowly evaporate to create a smooth layer. However, the solvents used may be volatile, representing significant health and safety questions.

Accordingly, current techniques to smooth a surface of a 3D printed article could use improvements and/or alternative or additional solutions in order to provide a quick, safe, and cost effective method to achieve a smooth surface.

SUMMARY

The present disclosure generally describes methods, apparatuses, systems, devices, and/or computer program products employed to increase surface smoothness of a three-dimensional (3D) printed article.

According to some examples, methods are provided to treat an initial surface of a 3D printed article. An example method may include providing the initial 3D printed article having an anionic surface. The example method may also include first treating the anionic surface with a first aqueous solution including at least one polycation to produce a first treated surface. The example method may further include second treating the first treated surface with a second aqueous solution including at least one anionic microparticle to produce a final 3D printed article having a second treated surface, where the polycation binds to the anionic surface and the anionic microparticle binds to the polycation.

According to other examples, a coated 3D printed article may be described. An example coated 3D printed article may include an initial 3D printed article having an anionic surface. The example coated 3D printed article may also include a first treated surface including at least one polycation that binds to the anionic surface. The example coated 3D printed article may further include a second treated surface including at least one anionic microparticle that binds to the polycation to produce a final 3D printed article.

According to further examples, systems to treat a surface of an initial 3D printed article are provided. An example system may include a surface modification module configured to modify the surface of the initial 3D printed article such that the surface of the initial 3D printed article provided is anionic. The example system may also include a first treatment module configured to treat the anionic surface with a first aqueous solution comprising at least one polycation to produce a first treated surface, where the polycation binds to the anionic surface. The example system may further include a second treatment module configured to treat the first treated surface with a second aqueous solution comprising at least one anionic microparticle to produce a final 3D printed article having a second treated surface, where the anionic microparticle binds to the polycation. The example system may even further include a controller configured to coordinate operations of the surface modification module, the first treatment module, and the second treatment module.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 8 illustrates a block diagram of an example computer program product, all arranged in accordance with at least some embodiments described herein.

DETAILED DESCRIPTION

Figure 1:
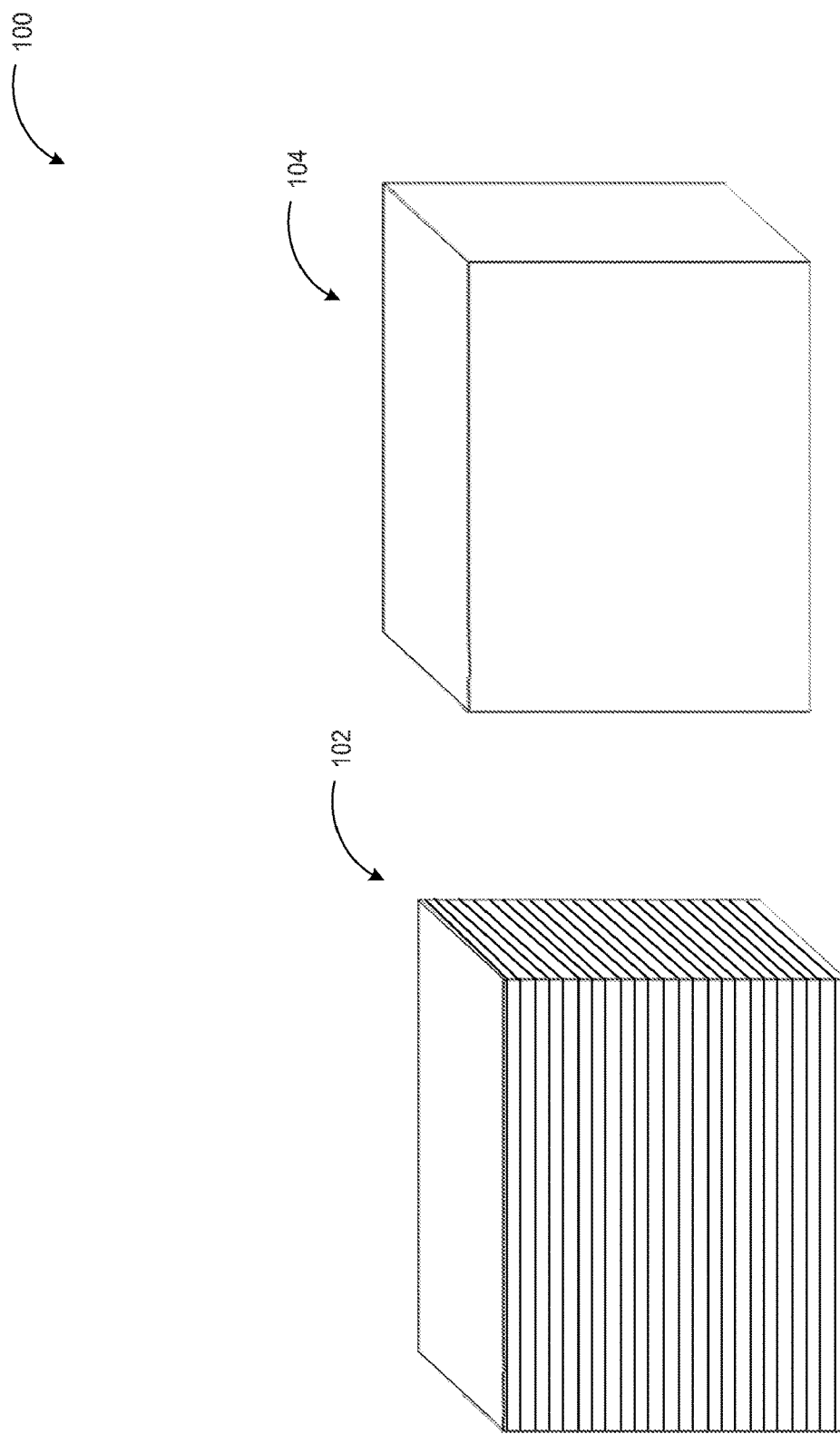
FIG. 1 illustrates an example surface of a three-dimensional (3D) printed article before and after a water-based treatment.

In the following detailed description, reference is made to the accompanying drawings, which form a part hereof. In the drawings, similar symbols typically identify similar articles, unless context dictates otherwise. The illustrative embodiments described in the detailed description, drawings, and claims are not meant to be limiting. Other embodiments may be used, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, among other things, to methods, apparatuses, systems, devices, and/or computer program products related to increasing a surface smoothness of a three-dimensional (3D) printed article.

Briefly stated, technologies are generally described to increase a surface smoothness of a 3D primed article implementing a water-based treatment using layer-by-layer (LBL) deposition. An initial 3D printed article having an anionic surface may be treated with a first aqueous solution comprising at least one polycation that may bind to the anionic surface to produce a first treated surface, which may be rinsed with water to remove the first aqueous solution. The first treated surface may be treated with a second aqueous solution comprising at least one anionic microparticle that may bind to the polycation to produce a final 3D printed article having a second treated surface, which may be rinsed with water to remove the second aqueous solution. The bound polycation and anionic microparticle may be present as a single layer in the final 3D printed article that may act as a conformal coating to increase the surface smoothness.

FIG. 1 illustrates an example surface of a 3D printed article before and after a water-based treatment, arranged in accordance with at least some embodiments described herein.

As shown in a diagram 100, a surface of an initial 3D printed article 102 prior to a water-based treatment and a surface of a final 3D printed article 104 following the water-based treatment may illustrate effects of the water-based treatment on a smoothness of a surface of a 3D printed article.

The surface of the initial 3D printed article 102 may include a pattern of ridges, which reflect a resolution of one or more filament or powder layers used to print the article, as illustrated. The surface of the initial 3D printed article 102 may be modified prior to treatment in order to make the surface anionic, if the surface does not already have a negative charge. Dependent on a material used to form the initial 3D printed article 102, a negative charge may be native to the material, such as with glass or ceramic, or due to oxidative defects in the material's surface, such as with polymers. For example, oxygen in air may create carboxylate defects on polymer surfaces, and the defects may be enhanced by surface modification to ensure that the surface is anionic by using an oxidative process step, such as a brief chemical etch, plasma etch, and/or corona discharge.

The initial 3D printed article 102 may then undergo a water-based treatment using a layer-by-layer (LBL) deposition process. For example, the surface of the initial 3D printed article 102 may be treated with a first aqueous solution, which may include at least one polycation that binds to the anionic surface to produce a first treated surface. The first treated surface may be rinsed with water to remove the first aqueous solution in order to maintain a uniformity of the first treated surface. The first treated surface may then be treated with a second aqueous solution, which includes at least one anionic microparticle that binds to the polycation of the first treated surface to produce the final 3D printed article 104 having a second treated surface. Similar to the first treated surface, the second treated surface may be rinsed with water to remove the second aqueous solution in order to maintain a uniformity of the second treated surface.

The bound polycation and one or more anionic microparticles may be present in the final 3D printed article 104 as a single layer having a particular thickness such that a smoothness of the surface of the final 3D printed article 104 may be higher than a smoothness of the surface of the initial 3D article 102. The single layer may act as a conformal coating that may grow evenly on the surface of the final 3D printed article 104, despite a possible non-uniform, arbitrary topography of the 3D printed article. The water-based treatment may be successively repeated in order to achieve a particular thickness of the conformal coating. Accordingly, the water-based treatment may offer a safe, time and cost efficient approach to smooth a surface of 3D printed articles, as no volatile organics are used, the first and second aqueous solutions are inexpensive to produce, and each layer of the conformal coating may take minutes to form.

Figure 2:
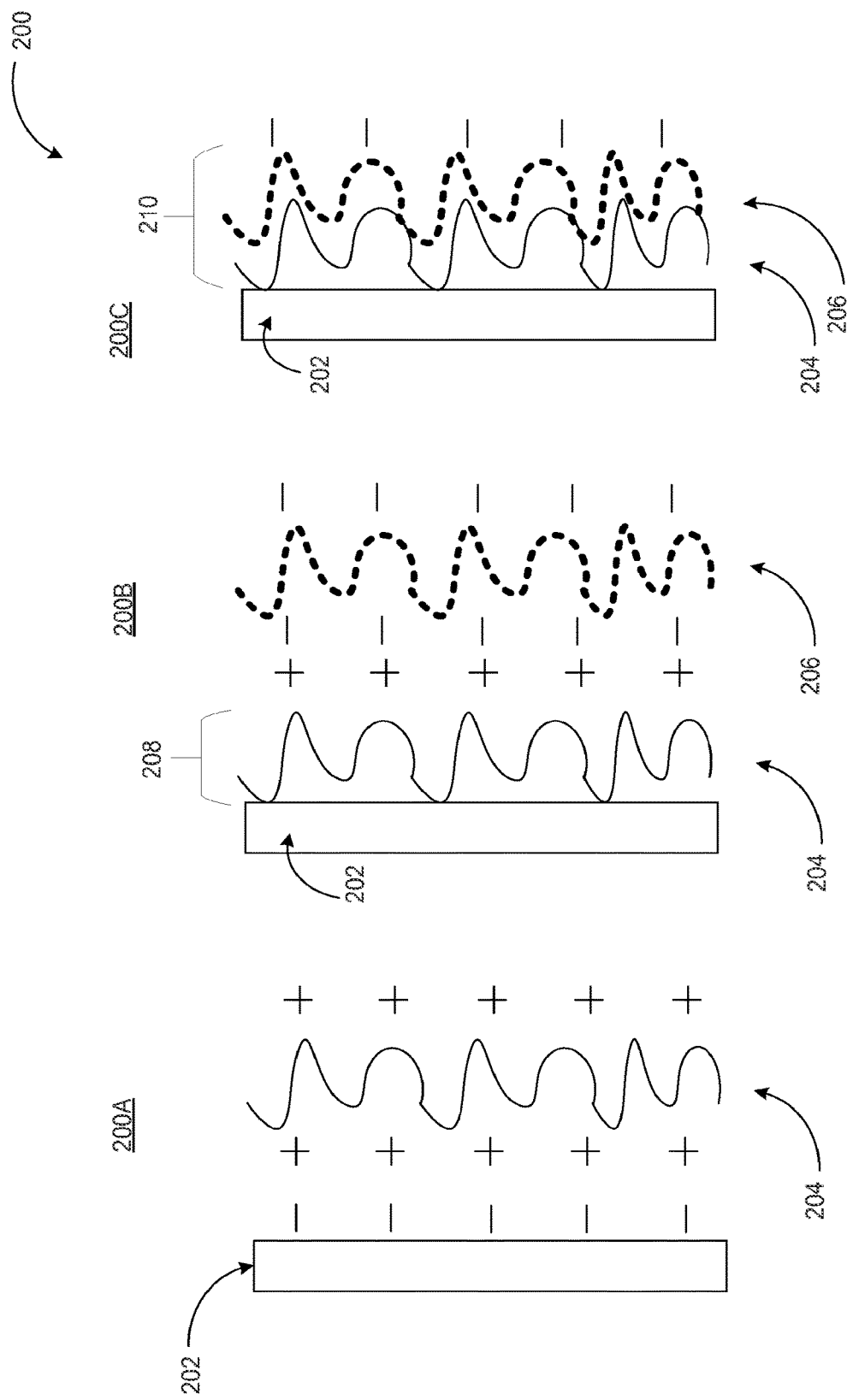
FIG. 2 illustrates an example water-based treatment using layer-by-layer (LBL) deposition that may increase smoothness of a surface of a 3D printed article.

FIG. 2 illustrates an example water-based treatment using LBL deposition that may increase smoothness of a surface of a 3D printed article, arranged in accordance with at least some embodiments described herein.

As shown in a diagram 200, a water-based treatment using an LBL deposition process may be implemented to increase a smoothness of a surface of an initial 3D printed article 202. An anionic surface of an initial 3D printed article 202 may be treated with a first aqueous solution that includes at least one polycation 204 in configuration 200A. The polycation 204 may bind to the anionic surface of an initial 3D printed article 202 to produce a first treated surface 208 as shown in configuration 200B. The first treated surface 208 may be rinsed with water to remove the first aqueous solution in order to maintain a uniformity of the first treated surface 208, and may be treated with a second aqueous solution that includes at least one polyanion 206. The polyanion 206 may bind to the polycation 204 of the first treated surface 208 to produce a final 3D printed article having a second treated surface 210 as shown in configuration 200C. The second treated surface 210 may be rinsed with water to remove the second aqueous solution in order to maintain a uniformity of the second aqueous solution. The bound polycation and polyanion may be present as a bilayer in the final 3D printed article at a particular thickness such that a smoothness of the surface of the final 3D particle is higher than a smoothness of the surface of the initial 3D article 202.

The polycation 204 may bind to the anionic surface of the initial 3D article 202 via electrostatic bonds or covalent bonds. Similarly, the polyanion 206 may bind to the polycation 204 via electrostatic bonds or covalent bonds. However, the polyanion 206 may be unable to planarize the first treated surface 208 on a micron scale during the treatment, and as a result one or more anionic microparticles may be a preferred component in the second aqueous solution to bind to the polycation 204, as discussed in FIG. 3 below.

Figure 3:
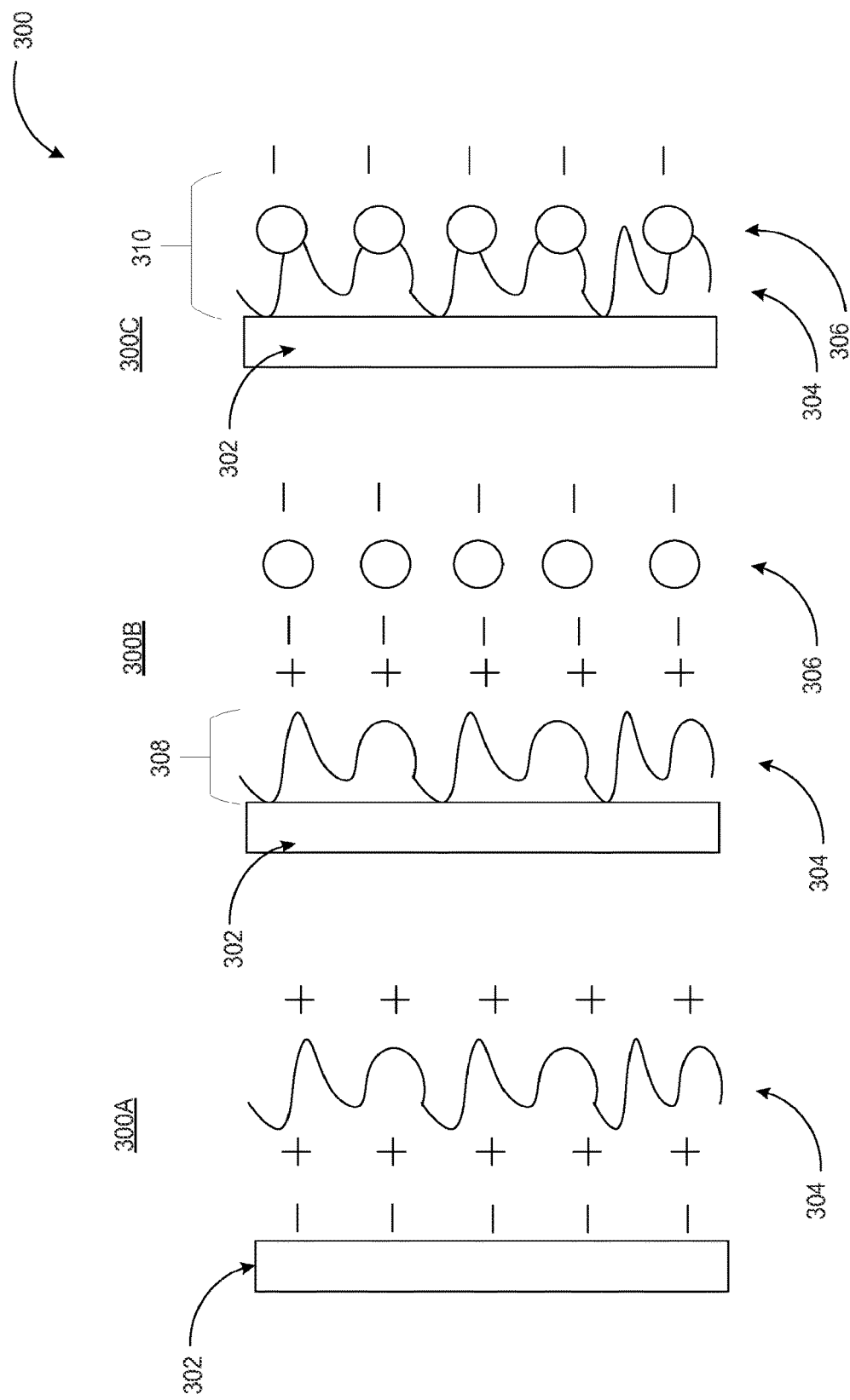
FIG. 3 illustrates another example water-based treatment using LBL deposition that may increase smoothness of a surface of a 3D printed article.

FIG. 3 illustrates another example water-based treatment using LBL deposition, arranged in accordance with at least some embodiments described herein.

As shown in diagram 300, a water-based treatment using an LBL deposition process may be implemented to increase a smoothness of a surface of an initial 3D printed article 302. An anionic surface of an initial 3D printed article 302 may be treated with a first aqueous solution that includes at least one polycation 304 in configuration 300A. The polycation 304 may bind to the anionic surface of an initial 3D printed article 302 to produce a first treated surface 308 as shown in configuration 300B. The anionic surface of the initial 3D printed article 302 may be treated for a pre-determined time period based on a concentration of the first aqueous solution, 15 seconds for example. A more highly concentrated first aqueous solution may deposit faster than less concentrated solutions, so the pre-determined time period may be increased or decreased to optimize process time while minimizing costs.

The first treated surface 308 may be rinsed with water to remove the first aqueous solution in order to maintain a uniformity of the first treated surface 308 and ultrasound waves may be applied to accelerate the rinsing step. The first treated surface 308 may then be treated with a second aqueous solution that includes one or more anionic microparticles 306. The anionic microparticles 306 may bind to the polycation 304 of the first treated surface 308 to produce a final 3D printed article having a second treated surface 310 as shown in configuration 300C. The first treated surface 308 may be treated for a pre-determined time period based on a concentration of the second aqueous solution. The second treated surface 310 may be rinsed with water to remove the second aqueous solution in order to maintain a uniformity of the second treated surface 310, and ultrasound waves may be applied to accelerate the rinsing step and speed the transport of unbound anionic microparticles away from the second treated surface 310.

The bound polycation 304 and anionic microparticles 306 may be present as a single layer in the final 3D printed article at a particular thickness such that a smoothness of the surface of the final 3D particle is higher than a smoothness of the surface of the initial 3D article 302. The single layer may act as a conformal coating that may grow evenly on the surface of the 3D printed article, despite a possible non-uniform, arbitrary topography of the 3D printed article. The water-based treatment may be successively repeated to achieve a particular thickness for the conformal coating, where the thickness of the conformal coating may grow linearly with a number of successive treatments. In some embodiments, the final 3D printed article may be heated to a temperature above a glass transition temperature ($T_g$) of the anionic microparticle such that the surface of the final 3D primed article may have a higher smoothness after the heating step than immediately before the heating step.

The polycation 304 may bind to the anionic surface of the initial 3D article 302 via electrostatic bonds or covalent bonds. The polycation 304 may be dissolved or diluted in water at a concentration, such as to a concentration of about 1 mM to about 100 mM within the first aqueous solution to treat the first treated surface. Once bound to the anionic surface, the polycation 304 may not be re-dissolved in the first aqueous solution. The polycation 304 may be polyethylenimine, poly(allylamine hydrochloride), poly(diallyldimethyl ammonium chloride), or poly(isocyanate), for example. In some embodiments, sodium chloride (NaCl) may also be dissolved within the first aqueous solution to a concentration of about 0.001M to about 1 M, for example, to screen one or more ions from one another, which may speed the rate that the polycation 304 binds to the anionic surface. The of first aqueous solution may be adjusted to a pH, such as to about pH 4 to about pH 7 to make it more likely that the polyethylenimine or poly(allylamine hydrochloride), for example, are protonated, and are thus polycationic. pH adjustment may not be needed for poly(diallyldimethyl ammonium chloride), which is a quaternary ammonium salt and may therefore be inherently protonated.

The anionic microparticles 306 may bind to the polycation 304 via electrostatic bonds or covalent bonds. The anionic microparticles 306 may be suspended in water within a second aqueous solution to treat the first treated surface, where the anionic microparticles 306 may planarize the first treated surface on a micron scale during the treatment. Once bound to the polycation 304, the anionic microparticles 306 may not be re-suspended in the second aqueous solution. The anionic microparticles 306 may maintain their anionic nature due to an addition of a small fraction of free acid monomer to the second aqueous solution, and pH adjustments to maintain a pH greater than or equal to pH 4. The anionic microparticles 306 may be silica microparticles, such as glass, and/or polymer microparticles. If the anionic microparticles 306 include one or more polymer microparticles, the polymer microparticles may include polystyrene, poly(methylmethacrylate), melamine resin, polyurethane, and/or polyol, for example.

A selected size of the anionic microparticles 306 may be adjustable. For example, the anionic microparticles 306 may be about 2 μm in size, however larger or smaller particles may be used be used. The anionic microparticles 306 may be selected such that the $T_g$ of the anionic microparticles are above 21° C. to prevent blocking or transient adhesion to the first treated surface on application of pressure.

The anionic microparticles 306 may be in a form of a hard sphere or a soft deformable particle. Hard spheres may be configured to deliver a thicker conformal coating in fewer successive treatments, while soft deformable particles may be configured to collapse and ensure the conformal coating is maximally dense. In some embodiments, there may be a mixture of hard spheres and soil deformable particles in a single treatment. Additionally, the form of the anionic microparticles 306 may alternate from an initial treatment to a successive treatment, and so on.

In other embodiments at least one titania particle, at least one polyionic dye, or both may be added to the second aqueous solution prior to the second treating step such that the final 3D printed article has a colored surface. If the titania particle is added, the final 3D printed article may have a white or pastel hue, for example. For other colors, the polyionic dye may be added, which may be a porphyrin dye or a phthalocyanine dye, for example. Additionally, at least one silica particle may be added to the second aqueous solution prior to the second treating step such that the final 3D printed article has a scratch resistance that is higher than a substantially identical final 3D printed article made without adding the at least one silica particle step.

Figure 4:
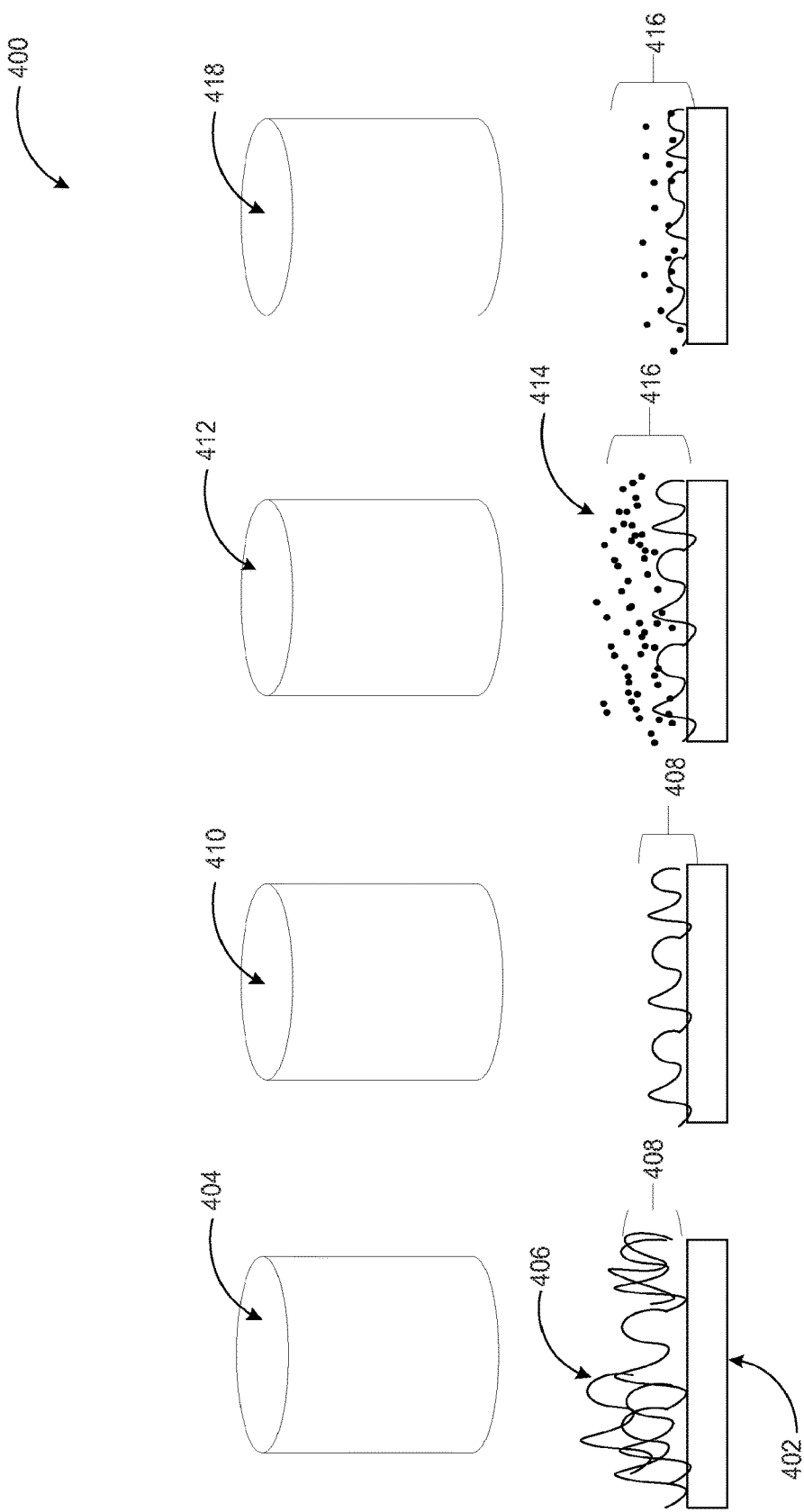
FIG. 4 illustrates an example water-based treatment and rinse process that may increase a smoothness of a surface of a 3D printed article.

FIG. 4 illustrates an example water-based treatment and rinse process that may increase a smoothness of a surface of a 3D printed article, arranged in accordance with at least some embodiments described herein.

As shown in diagram 400, a surface of an initial 3D printed article 402 is treated with a first aqueous solution that includes at least one polycation 406 to produce a first treated surface 408. The surface of an initial 3D printed article 402 may be treated by dipping and/or immersing the article into a first bath 404 containing the first aqueous solution for a predetermined time period based on a concentration of the first aqueous solution. The first treated surface 408 may be rinsed with water in a second bath 410 to remove the first aqueous solution in order to maintain a uniformity of the first treated surface 408. In some embodiments, ultrasound waves may be applied to accelerate the rinsing step.

The first treated surface 408 may then be treated with a second aqueous solution that includes at least one anionic microparticle 414 in order to produce a final 3D printed article having a second treated surface 416. The first treated surface 408 may be treated by dipping and/or immersing the first treated surface into a third bath 412 containing the second aqueous solution for a predetermined time period based on a concentration of the second aqueous solution. The second treated surface 416 may be rinsed with water in a fourth bath 418 to remove the second aqueous solution in order to maintain a uniformity of the second treated surface 416. In some embodiments, ultrasound waves may be applied to accelerate the rinsing step and speed the transport of unbound anionic microparticles away from the second treated surface 416.

The bound polycation 406 and anionic microparticles 414 may be present as a single layer in the final 3D printed article at a particular thickness such that a smoothness of the surface of the final 3D particle is higher than a smoothness of the surface of the initial 3D article 402. The single layer may act as a conformal coating that may grow evenly on the surface of 3D printed article, despite a possible non-uniform, arbitrary topography of the 3D printed article. The water-based treatment and rinse process may be successively repeated to achieve a particular thickness for the conformal coating, where the thickness of conformal coating may grow linearly with a number of successive treatments. Accordingly, the water-based treatment may offer a safe, time and cost efficient approach to smooth a surface of 3D printed articles, as no volatile organics are used, the first and second aqueous solutions are inexpensive to produce, and each layer of the conformal coating takes only minutes to form.

In another embodiment, the water-based treatment may be performed in conjunction with a pore-filling approach. Similar to the embodiments described above, the anionic surface of the initial 3D printed article may be treated with a first and second aqueous solution comprising a polyanion and at least one anionic microparticle respectively. In contrast to the embodiments described above, specific classes of polyanions, such as those that only weakly bond to an anionic surface, and thus have higher mobility, may be selected. These polyanions may tend to migrate into the pores after the initial bonding event, driven by the hydrophobic effect to minimize an interface with water. In such an approach, the conformal coating may grow in thickness exponentially with a number of successive treatments rather than linearly, as the polyanions are not immobilized upon binding with the surface, and therefore may migrate inwards within the pores during the treatment to allow further polyanions to bind to the surface.

Figure 5:
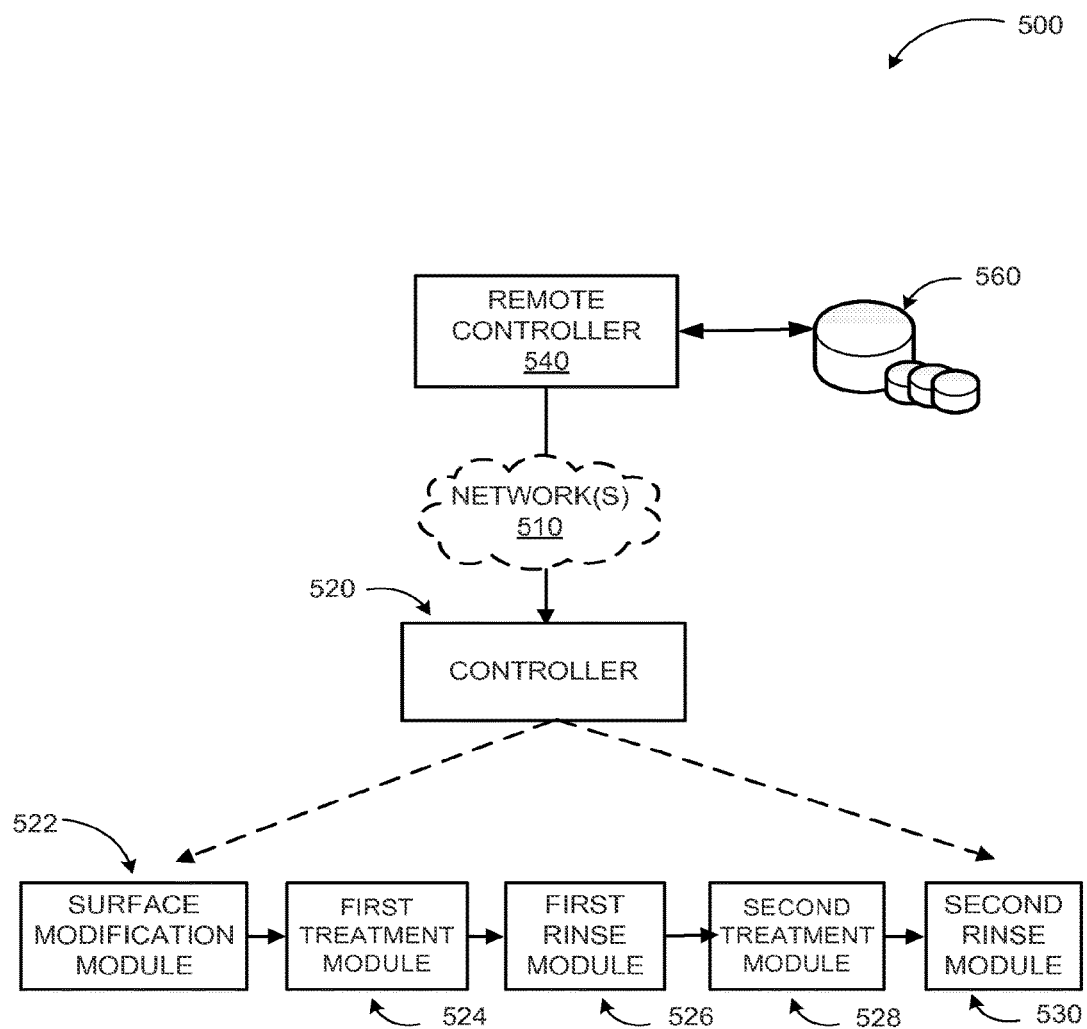
FIG. 5 illustrates an example system to implement a water-based treatment and rinse process in order to increase smoothness of a surface of a 3D printed article.

FIG. 5 illustrates an example system to implement a water-based surface treatment in order to increase smoothness of a surface of a 3D printed article, arranged in accordance with at least some embodiments described herein.

System 500 may include at least one controller 520, at least one surface modification module 522, at least one first treatment module 524, at least one first rinse module 526, at least one second treatment module 528, and at least one second rinse module 530. The controller 520 may be operated by human control or may be configured for automatic operation, or may be directed by a remote controller 540 through at least one network (for example, via network 510). Data associated with controlling the different processes of production may be stored at and/or received from data stores 560.

The controller 520 may include or control the surface modification module 522 configured to modify a surface of an initial 3D printed article such that the surface is anionic. The controller 520 may also include or control the first treatment module 524 configured to treat the surface of an initial 3D printed article with a first aqueous solution comprising at least one polycation to produce a first treated surface, and the first rinse module 526 configured to rinse the first treated surface with water to remove the first aqueous solution. The controller 520 may thither include or control the second treatment module 528 configured to treat the first treated surface with a second aqueous solution comprising at least one anionic microparticle to produce a final 3D printed article having a second treated surface, and the second rinse module 530 configured to rinse the second treated surface with water to remove the second aqueous solution.

The surface modification module 522 may be configured to modify a surface of an initial 3D printed article such that the surface is anionic. Depending on a material used to form the initial 3D printed article, a negative charge may be native to the material, such as with glass or ceramic, or due to oxidative defects in the material's surface, such as with polymers. For example, oxygen in air may create carboxylate defects on polymer surfaces. The defects may be enhanced by surface modification to ensure that the surface is anionic by using an oxidative process step, such as a brief chemical etch, plasma etch, and/or corona discharge.

The first treatment module 524 may be configured to treat the anionic surface of the initial 3D printed article with a first aqueous solution that includes at least one polycation by one of dipping and/or immersing the initial 3D printed article in the first aqueous solution. The anionic surface of the initial 3D printed article may be treated for a pre-determined time period based on a concentration of the first aqueous solution. The polycation may bind to the anionic surface of the initial 3D printed article to produce a first treated surface.

The first rinse module 526 may be configured to rinse the first treated surface with water to remove the first aqueous solution. The first rinse module 526 may also be configured to apply ultrasound waves to accelerate the rinsing step.

The second treatment module 528 may be configured to treat the first treated surface with a second aqueous solution that includes one or more anionic microparticles by one of dipping and/or immersing the first treated surface in the second aqueous solution. The first treated surface may be treated for a pre-determined time period based on a concentration of the second aqueous solution. The anionic microparticles may bind to the polycation of the first treated surface to produce a final 3D printed article having a second treated surface.

The second rinse module 530 may be configured to rinse the second treated surface with water to remove the second aqueous solution. The second rinse module may also be configured to apply ultrasound waves to accelerate the rinsing step and speed the transport of unbound anionic microparticles away from the second treated surface.

The bound polycation and anionic microparticles may be present as a single layer in the final 3D printed article at a particular thickness such that a smoothness of the surface of the final 3D particle is higher than a smoothness of the surface of the initial 3D article. The single layer may act as a conformal coating that may grow evenly on the surface of the 3D article. The treatment may be successively repeated to achieve a particular thickness for the conformal coating.

The examples in FIGS. 1 through 5 have been described using specific apparatuses, configurations, and systems to increase surface smoothness of a 3D printed article through implementation of a water-based treatment using LBL deposition. Embodiments to increase surface smoothness of a 3D printed article are not limited to the specific apparatuses, configurations, and systems according to these examples.

Figure 6:
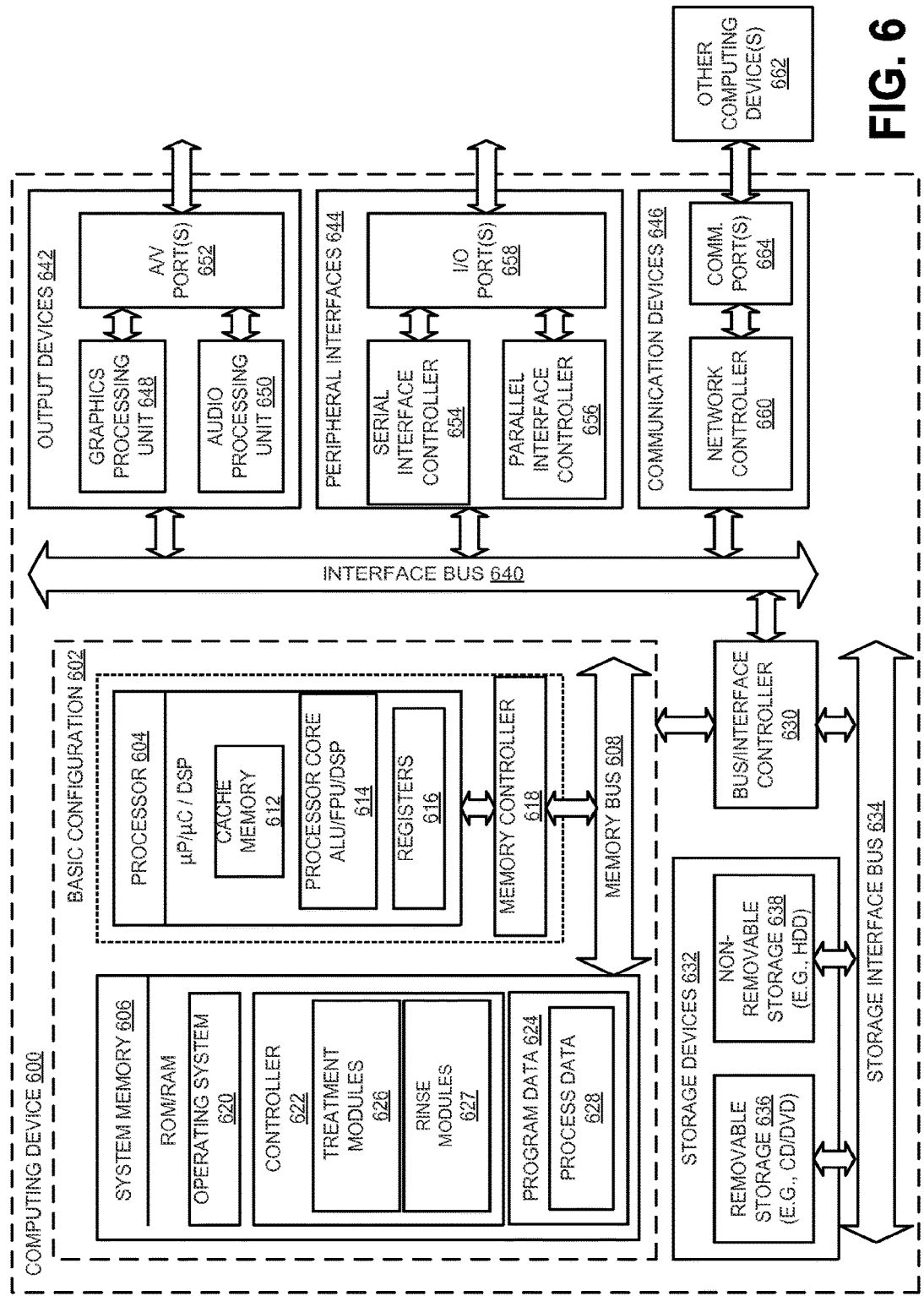
FIG. 6 illustrates a general purpose computing device, which may be used to facilitate a system employed to increase a smoothness of a surface of a 3D printed article.

FIG. 6 illustrates a general purpose computing device, which may be used to facilitate a system employed to increase a surface smoothness of a 3D printed article, arranged in accordance with at least some embodiments described herein.

For example, the computing device 600 may be used as a server, desktop computer, portable computer, smart phone, special purpose computer, or similar device such as a controller, a new component, a cluster of existing components in an operational system including a vehicle and a smart dwelling. In an example basic configuration 602, the computing device 600 may include one or more processors 604 and a system memory 606. A memory bus 608 may be used for communicating between the processor 604 and the system memory 606. The basic configuration 602 is illustrated in FIG. 6 by those components within the inner dashed line.

Depending on the desired configuration, the processor 604 may be of any type, including but not limited to a microprocessor (µP), a microcontroller (µC), a digital signal processor (DSP), or any combination thereof. The processor 604 may include one more levels of caching, such as a level cache memory 612, one or more processor cores 614, and registers 616. The example processor cores 614 may (each) include an arithmetic logic unit (ALU), a floating point unit (FPU), a digital signal processing core (DSP Core), or any combination thereof. An example memory controller 618 may also be used with the processor 604, or in some implementations the memory controller 618 may be an internal part of the processor 604.

Depending on the desired configuration, the system memory 606 may be of any type including but not limited to volatile memory (such as RAM), non-volatile memory (such as ROM, flash memory, etc.) or any combination thereof. The system memory 606 may include an operating system 620, a controller application 622, and program data 624. The controller application 622 may include treatment modules 626 and rinse modules 627, which may be an integral part of the application or a separate application on its own. The treatment modules 626 may include a first treatment module configured to treat the initial 3D printed article with a first aqueous solution comprising at least one polycation to produce a first treated surface. The treatment modules 626 may also include a second treatment module configured to treat the first treated surface with a second aqueous solution comprising at least one anionic particle to produce a final 3D printed article having a second treated surface. The rinse modules 627 may include a first rinse module configured to rinse the first treated surface with water prior to the second treating step to remove the first aqueous solution and a second rinse module configured to rinse the second treated surface to remove the second aqueous solution. The program data 624 may include, among other data, process data 628 related to surface treatment and surface rinsing, as described herein.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology. CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 646) to the basic configuration 602 via the bus/interface controller 630. Some of the example output devices 642 include a graphics processing unit 648 and an audio processing unit 650, which may be configured to communicate to various external devices such as a display or speakers via one or more A/V ports 652. One or more example peripheral interfaces 644 may include a serial interface controller 654 or a parallel interface controller 656, which may be configured to communicate with external devices such as input devices (for example, keyboard, mouse, pen, voice input device, touch input device, etc.) or other peripheral devices (for example, printer, scanner, etc.) via one or more I/O ports 658. An example communication device 646 includes a network controller 660, which may be arranged to facilitate communications with one or more other computing devices 662 over a network communication link via one or more communication ports 664. The one or more other computing devices 662 may include servers, client devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a part of a general purpose or specialized server, mainframe, or similar computer that includes any of the above functions. The computing device 600 may also be implemented as a personal computer including both laptop computer and non-laptop computer configurations.

Example embodiments may also include methods to increase a smoothness of the surface of the 3D printed article implementing a water-based surface treatment using LBL deposition. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 7:
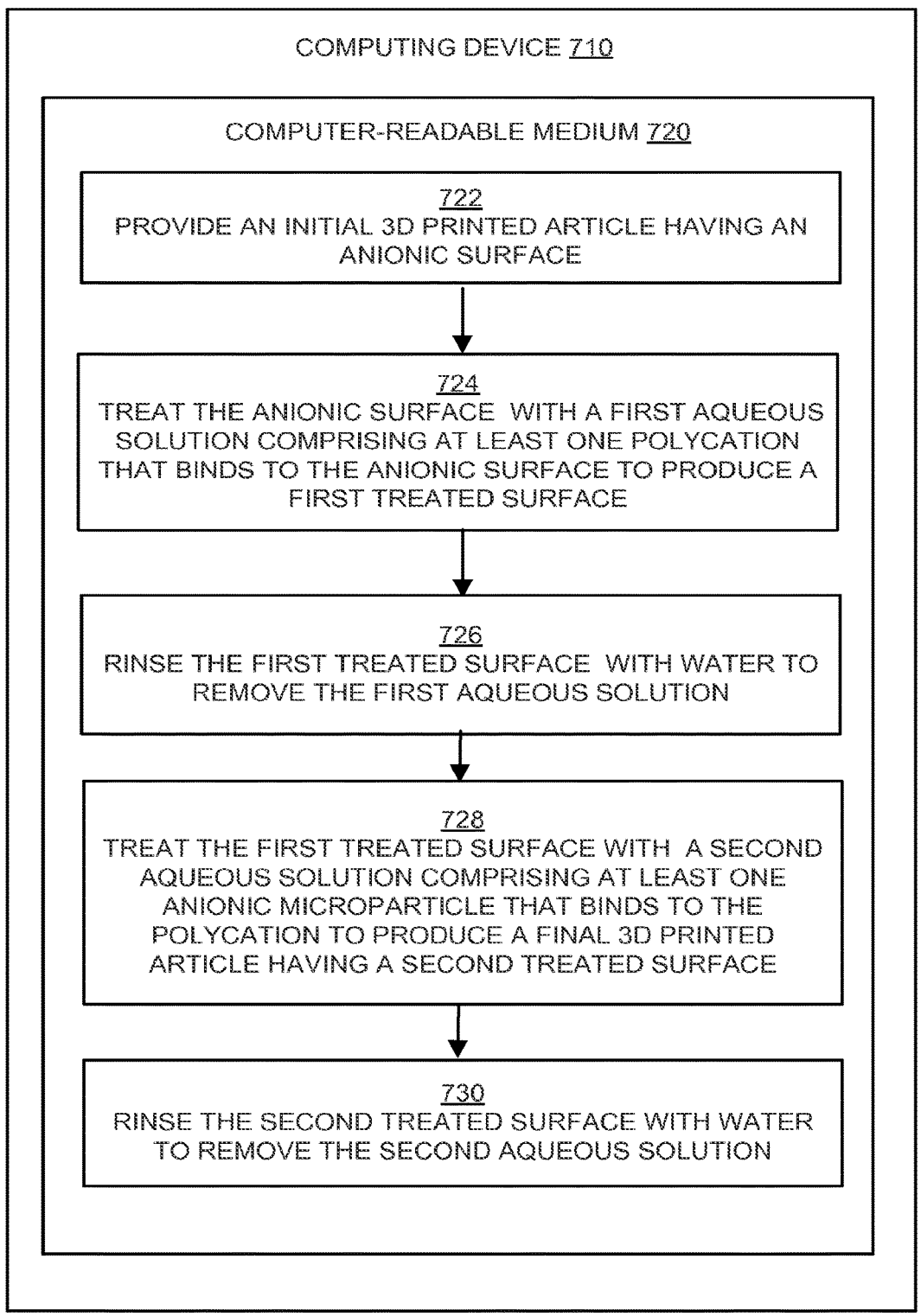
FIG. 7 is a flow diagram illustrating an example method to implement a water-based treatment and rinse process in order to increase smoothness of a surface of a 3D printed article that may be performed by a computing device such as the computing device in FIG. 6.

FIG. 7 is a flow diagram illustrating an example method to implement a water-based surface treatment in order to increase smoothness of a surface of a 3D printed article that may be performed by a computing device such as the computing device in FIG. 6, arranged in accordance with at least some embodiments described herein.

Example methods may include one or more operations, functions or actions as illustrated by one or more of blocks 722, 724, 726, 728 and/or 730. The operations described in the blocks 722 through 710 may also be stored as computer-executable instructions in a computer-readable medium such as a computer-readable medium 720 of a computing device 710.

An example process to increase interlayer adhesion of a 3D printed article may begin with block 722, "PROVIDE AN INITIAL 3D PRINTED ARTICLE HAVING AN ANIONIC SURFACE," where an initial 3D printed article may be configured to have an anionic surface, in some examples, an anionic surface may be native to a material from which the initial 3D article was formed, such as glass or ceramic materials. Alternatively, a surface of the initial 3D printed article may be modified by a surface modification module such that the surface is anionic. For example, an oxidative process step such as a brief chemical etch, plasma etch, and/or corona discharge may be implemented to modify the surface such that the surface is anionic.

Block 722 may be followed by block 724, "TREAT THE ANIONIC SURFACE WITH A FIRST AQUEOUS SOLUTION COMPRISING AT LEAST ONE POLYCATION THAT BINDS TO THE ANIONIC SURFACE TO PRODUCE A FIRST TREATED SURFACE," where a first treatment module may be configured to treat the anionic surface of the initial 3D printed article with a first aqueous solution that includes at least one polycation. The polycation may bind to the anionic surface to produce a first treated surface via electrostatic or covalent bonds. The anionic surface may be treated for a pre-determined time based on a concentration of the first aqueous solution. For example, less treatment time may be needed for a more highly concentrated first aqueous solution.

Block 724 may be followed by block 726, "RINSE THE FIRST TREATED SURFACE WITH WATER TO REMOVE THE FIRST AQUEOUS SOLUTION," where a first rinse module may be configured to rinse the first treated surface with water to remove the first aqueous solution in order to maintain a uniformity of the first aqueous solution. The first rinse module may further be configured to apply ultrasound waves during the rinse to accelerate the rinsing step.

Block 726 may be followed by block 728, "TREAT THE FIRST TREATED SURFACE WITH A SECOND AQUEOUS SOLUTION COMPRISING AT LEAST ONE ANIONIC MICROPARTICLE THAT BINDS TO THE POLYCATION TO PRODUCE A FINAL 3D PRINTED ARTICLE HAVING A SECOND TREATED SURFACE," where a second treatment module may be configured to treat the first treated surface with a second aqueous solution that includes at least one anionic microparticle. The anionic microparticle may bind to the polycation in the first treated surface via an electrostatic bond or covalent bond in order to produce a final 3D printed article having a second treated surface. The first treated surface may be treated for a pre-determined time based on a concentration of the second aqueous solution. For example, less treatment time may be needed for a more highly concentrated second aqueous solution.

Block 728 may be followed by block 730, "RINSE THE SECOND TREATED SURFACE WITH WATER TO REMOVE THE SECOND AQUEOUS SOLUTION," where a second rinse module may be configured to rinse the second treated surface with water to remove the second aqueous solution in order to maintain a uniformity of the second aqueous solution. The second rinse module may further be configured to apply ultrasound waves during the rinse to accelerate the rinsing step and in order to accelerate a speed at which the unbound anionic microparticles may separate from the second treated surface.

The blocks included in the above described process are for illustration purposes. Water-based treatment and rinsing of a surface of an initial 3D object in order to increase a smoothness of the final 3D object may be implemented by similar processes with fewer or additional blocks. In some embodiments, the blocks may be performed in a different order. In some other embodiments, various blocks may be eliminated. In still other embodiments, various blocks may be divided into additional blocks, or combined together into fewer blocks.

FIG. 8 illustrates a block diagram of an example computer program product, arranged in accordance with at least some embodiments described herein.

In some embodiments, as shown in FIG. 8, the computer program product 800 may include a signal bearing medium 802 that may also include one or more machine readable instructions 804 that, when executed by, for example, a processor, may provide the functionality described herein. Thus, for example, referring to the processor 604 in FIG. 6, treatment modules 626 and rinse modules 627 executed on the processor 604 may undertake one or more of the tasks shown in FIG. 8 in response to the instructions 804 conveyed to the processor 604 by the medium 802 to perform actions associated with increasing surface smoothness of a 3D printed article as described herein. Some of those instructions may include, for example, one or more instructions to provide an initial 3D printed article having an anionic surface, treat the anionic surface with a first aqueous solution comprising at least one polycation that binds to the anionic surface to produce a first treated surface, rinse the first treated surface with water to remove the first aqueous solution, treat the first treated surface with a second aqueous solution comprising at least one anionic microparticle that binds to the polycation to produce a final 3D printed article having a second treated surface, and rinse the second treated surface with water to remove the second aqueous solution.

In some implementations, the signal bearing medium 802 depicted in FIG. 8 may encompass a computer-readable medium 806, such as, but not limited to, a hard disk drive, a solid state drive, a Compact Disc (CD), a Digital Versatile Disk (DVD), a digital tape, memory, etc. In some implementations, the signal bearing medium 802 may encompass a recordable medium 808, such as, but not limited to, memory, read/write (VW) CDs, R/W DVDs, etc. In some implementations, the signal bearing medium 802 may encompass a communications medium 810, such as, but not limited to, a digital and/or an analog communication medium (for example, a fiber optic cable, a waveguide, a wired communications link, a wireless communication link, etc.). Thus, for example, the program product 800 may be conveyed to one or more modules of the processor 604 of FIG. 6 by an RF signal bearing medium, where the signal bearing medium 802 is conveyed by the wireless communications medium 810 (for example, a wireless communications medium conforming with the IEEE 802.11 standard).

According to some embodiments, methods are provided to treat a surface of an initial 3D printed article. An example method may include providing the initial 3D printed article having an anionic surface. The example method may also include first treating the anionic surface with a first aqueous solution including at least one polycation to produce a first treated surface. The example method may further include second treating the first treated surface with a second aqueous solution including at least one anionic microparticle to produce a final 3D printed article having a second treated surface, where the polycation binds to the anionic surface and the anionic microparticle binds to the polycation.

In other embodiments, the initial 3D printed article may be modified on the surface such that the surface is made anionic. The first treated surface may be rinsed with water prior to the second treating step, where the rinsing removes the first aqueous solution. Ultrasound waves may be applied during the rinsing step. The second treated surface may be rinsed with water, where the rinsing removes the second aqueous solution. The ultrasound waves may be applied during the rinsing step. The polycation may be present in the final 3D printed article as a single layer having a particular thickness such that a smoothness of the surface of the final 3D printed article may be higher than a smoothness of the surface of the initial 3D article. The final 3D printed article may be heated to a temperature above a glass transition temperature ($T_g$) of the anionic microparticle. The surface of the final 3D printed article may have a higher smoothness after the heating step than immediately before the heating step.

In further embodiments, the anionic surface may be treated with the first aqueous solution for a pre-defined time period based on a concentration of the first aqueous solution. The first treated surface may be treated with the second aqueous solution for a pre-defined time period based on a concentration of the first aqueous solution. At least one titania particle, at least one polyionic dye, or both may be added to the second aqueous solution prior to the second treating step. The final 3D printed article may have a colored surface. The polyionic dye may be a porphyrine dye or a phthalocyanine dye. At least one silica particle may be added to the second aqueous solution prior to the second treating step. The final 3D printed article may have a scratch resistance that is higher than a substantially identical final 3D printed article made without adding the at least one silica particle step.

In some examples, a coated 3D printed article may be described. An example coated 3D printed article may include an initial 3D printed article having an anionic surface. The example coated 3D printed article may also include a first treated surface including at least one polycation that binds to the anionic surface. The example coated 3D printed article may further include a second treated surface including at least one anionic microparticle that binds to the polycation to produce a final 3D printed article.

In other examples, the coated 3D printed article may further include the polycation binding to the anionic surface via electrostatic bonds or covalent bonds. The anionic microparticle may bind to the polycation via electrostatic bonds or covalent bonds. The polycation may be dissolved or diluted in water to a concentration of about 1 mM to about 100 mM within the first aqueous solution to treat the first treated surface. The polycation may be polyethylenimine, poly(allylamine hydrochloride), poly(diallyldimethyl ammonium chloride), or poly(isocyanate). Sodium chloride (NaCl) may also be dissolved within the first aqueous solution to a concentration of about 0.01M to screen one or more ions from one another. The anionic microparticle may be suspended in water within a second aqueous solution to treat the second treated surface. The anionic microparticle may be a silica microparticle or a polymer microparticle. The polymer microparticle may include polystyrene, poly(methylmethacrylate), melamine resin, polyurethane, and/or polyol. The anionic microparticle may be a hard sphere or a soft deformable particle. The anionic microparticle may be selected such that a glass transition temperature ($T_g$) of the anionic microparticle is above 21° C.

According to some embodiments, systems to treat a surface of an initial 3D printed article. An example system may include a surface modification module configured to modify the surface of the initial 3D printed article such that the surface of the initial 3D printed article provided is anionic. The example system may also include a first treatment module configured to treat the anionic surface with a first aqueous solution comprising at least one polycation to produce a first treated surface, where the polycation binds to the anionic surface. The example system may further include a second treatment module configured to treat the first treated surface with a second aqueous solution comprising at least one anionic microparticle to produce a final 3D printed article having a second treated surface, where the anionic microparticle binds to the polycation. The example system may even further include a controller configured to coordinate operations of the surface modification module, the first treatment module, and the second treatment module.

In other embodiments, the system may include a first rinse module configured to rinse the first treated surface with water prior to the second treating step in order to remove the first aqueous solution. Ultrasound waves may be applied during the rinse step. The polycation may be present in the final 3D printed article as a single layer having a particular thickness such that a smoothness of the surface of the final 3D printed article may be higher than a smoothness of the surface of the initial 3D article. The final 3D printed article may be heated to a temperature above a glass transition temperature ($T_g$) of the anionic microparticle such that a smoothness of the surface of the final 3D printed article after the heating step is higher than a smoothness of the surface of the final 3D printed article immediately before the heating step. The first treatment module may be configured to treat the anionic surface with the first aqueous solution for a pre-defined time period based on a concentration of the first aqueous solution. The second treatment module may be configured to treat the first treated surface with the second aqueous solution for a pre-defined time period based on a concentration of the second aqueous solution.

EXAMPLES

Following are illustrative examples of how some embodiments may be implemented, and are not intended to limit the scope of embodiments in any way.

Example 1: Water-Based Surface Treatment Implemented to Increase a Surface Smoothness of a 3D Printed Article A material used to form an initial 3D printed article may be glass, which may have a native negative charge causing the initial 3D printed article to have an anionic surface. The anionic surface of the initial 3D printed article may be treated with a first aqueous solution by immersing the surface of the initial 3D printed article in a bath containing the first aqueous solution for 15 seconds. The first aqueous solution may include poly(allylamine hydrochloride) dissolved in water to a concentration of about 10 mM, and sodium chloride (NaCl) dissolved to a concentration of about 0.01M to screen one or more ions from one another. The pH of first aqueous solution may be adjusted to a pH 5 to ensure that the poly(allylamine hydrochloride) is protonated, and thus polycationic. The poly(allylamine hydrochloride) may bind to the anionic surface of the initial 3D printed article via a covalent bond to produce a first treated surface. The first treated surface may be rinsed with water to remove the first aqueous solution by immersing the first treated surface in a water bath for 15 seconds. Ultrasound waves may be applied during rinsing to accelerate a rate of rinsing in order to decrease a time of the rinsing.

The first treated surface may be treated with a second aqueous solution by immersing the first treated surface in a bath containing the second aqueous solution for 15 seconds. The second aqueous solution may include a combination of glass microparticles in a form of hard spheres and polystyrene microparticles in a form of soft deformable particles that may be suspended in water. A selected size of the microparticles may be 2 μm, and a glass transition temperature ($T_g$) of the microparticles may be above 21° C. to prevent blocking or transient adhesion to the first treated surface on application of pressure. A small fraction of free acid monomer may be added to the second aqueous solution to maintain an anionic nature of the microparticles, and a pH may be adjusted to maintain a pH greater than or equal to pH 4. Furthermore, one or more titania particles may be added to the second aqueous solution such that the final 3D printed article has a white or pastel hue color.

The anionic microparticles may bind to the poly(allylamine hydrochloride) of the first treated surface via a covalent bond to produce a final 3D printed article having a second treated surface. The second treated surface may be rinsed with water to remove the second aqueous solution by immersing the second treated surface in a water bath for 15 seconds. Ultrasound waves may also be applied to accelerate the rinsing step and speed the transport of unbound anionic microparticles away from the second treated surface. The bound poly(allylamine hydrochloride) and anionic microparticles may be present as a single layer in the final 3D printed article at a thickness of 2 μm such that a smoothness of the surface of the final 3D particle is higher than a smoothness of the surface of the initial 3D article. The final 3D printed article may be heated to a temperature above a glass transition temperature $T_g$ of the anionic microparticle such that surface of the final 3D printed article may have a higher smoothness after the heating step than immediately before the heating step.

The single layer may act as a conformal coating that may grow evenly on the surface of the final 3D printed article. The treatment process may be successively repeated to achieve a particular thickness for the conformal coating, where the thickness of the conformal coating grows linearly with a number of successive treatments. For example, 11 successive treatment processes may be performed to achieve a conformal coating of 24 μm thickness.

Example 2: Surface Modification and Water-Based Surface Treatment Implemented to Increase a Surface Smoothness of a 3D Printed Article A material used to form an initial 3D printed article may be thermoplastic resin. Oxygen in air may create carboxylate defects on a surface of the initial 3D printed article, due to the polymer nature of the thermoplastic resin. These defects may be enhanced by surface modification to ensure that the surface is anionic by using an oxidative process step, such as a brief chemical etch. The anionic surface of the initial 3D printed article may be treated with a first aqueous solution by dipping at least a portion of the surface of the initial 3D printed article in a bath containing the first aqueous solution for 30 seconds. The first aqueous solution may include poly(diallyldimethyl ammonium chloride) diluted in water to a concentration of about 1 mM, and sodium chloride (NaCl) dissolved to a concentration of about 0.01M to screen one or more ions from one another. The poly(diallyldimethyl ammonium chloride) is a quaternary ammonium salt and therefore, no pH adjustment is needed to ensure protonation and polyanionic character. The poly(diallyldimethyl ammonium chloride) may bind to the anionic surface of the initial 3D printed article via an electrostatic bond to produce a first treated surface. The first treated surface may be rinsed with water to remove the first aqueous solution by immersing the first treated surface in a water bath for 30 seconds. Ultrasound waves may be applied during rinsing to accelerate a rate of rinsing in order to decrease a time of the rinsing.

The first treated surface may be treated with a second aqueous solution by dipping the first treated surface in a bath containing the second aqueous solution for 30 seconds. The second aqueous solution may include a poly(methylmethacrylate) microparticles in a form of hard spheres that may be suspended in water. A selected size of the poly(methylmethacrylate) microparticles may be 4 μm, and a $T_g$ of the poly(methylmethacrylate) microparticles may be above 21° C. to prevent blocking or transient adhesion to the first treated surface on application of pressure. A small fraction of free acid monomer may be added to the second aqueous solution to maintain an anionic nature of the poly(methylmethacrylate) microparticles, and a pH may be adjusted to maintain a pH greater than or equal to pH 4. Furthermore, a polyionic dye may be added, such as a porphyrin dye, such that the surface of the final 3D printed article has a color. Additionally, at least one silica particle may be added to the second aqueous solution such that the final 3D printed article has a scratch resistance that is higher than a substantially identical final 3D printed article made without adding the at least one silica particle step.

The poly(methylmethacrylate) microparticles may bind to the poly(diallyldimethyl ammonium chloride) of the first treated surface via an electrostatic bond to produce a final 3D printed article having a second treated surface. The second treated surface may be rinsed with water to remove the second aqueous solution by immersing the second treated surface in a water bath for 30 seconds. Ultrasound waves may also be applied to accelerate the rinsing step and speed the transport of unbound poly(methylmethacrylate) microparticles away from the second treated surface.

The bound poly(diallyldimethyl ammonium chloride) and poly(methylmethacrylate) microparticles may be present as a single layer in the final 3D printed article at a thickness of 4 μm such that a smoothness of the surface of the final 3D particle is higher than a smoothness of the surface of the initial 3D article. The single layer may act as a conformal coating that may grow evenly on the surface of the final 3D printed article. The treatment process may be successively repeated to achieve a particular thickness for the conformal coating, where the thickness grows linearly with a number of successive treatments. For example, 5 treatments may be performed successively to achieve a conformal coating of 24 µm thickness.

Example 3: A Pore-Filling Approach Implemented in Conjunction with a Water-Based Treatment to Increase Surface Smoothness of a 3D Printed Article A material used to form an initial 3D printed article may be ceramic, which may have a native negative charge causing a surface of the initial 3D printed article to be anionic. The anionic surface of the initial 3D printed article may be treated with a first aqueous solution by soaking the initial 3D printed article in a bath containing the aqueous solution for 2 minutes. When implementing pore-filling in conjunction with the water-based treatment, specific classes of polyanions that only weakly bond to the anionic surface, and thus have higher mobility may be used. These polyanions tend to migrate into pores after the initial bonding event, driven by the hydrophobic effect to minimize an interface with water. For example, the first aqueous solution may include polyethyleneimine dissolved in water to a concentration of about 100 mM, and sodium chloride (NaCl) dissolved to a concentration of about 0.01M to screen one or more ions from one another. The pH of first aqueous solution may be adjusted to a pH 7.5 to ensure that the polyethylenimine is protonated, and thus polycationic. The polyethylenimine may weakly bind to the anionic surface of the initial 3D printed article, filling in the pores to produce a first treated surface. The first treated surface may be rinsed with water to remove the first aqueous solution by soaking the first treated surface in a water bath for 2 minutes. Ultrasound waves may be applied during rinsing to accelerate a rate of rinsing in order to decrease a time of the rinsing.

The first treated surface may be treated with a second aqueous solution by immersing the first treated surface in a bath containing the second aqueous solution for 2 minutes. The second aqueous solution may include latex microparticles. A selected size of the microparticles may be 8 µm, and a $T_g$ of the microparticles may be above 21° C. to prevent blocking or transient adhesion to the first treated surface on application of pressure. A small fraction of free acid monomer may be added to the second aqueous solution to maintain an anionic nature of the microparticles, and a pH may be adjusted to 3.5. Furthermore, polyionic dye may be added, such as a phthalocyanine dye, such that the surface of the final 3D printed article has a color.

The latex microparticles may bind to the polyethylenimine of the first treated surface to produce a final 3D printed article having a second treated surface. The second treated surface may be rinsed with water to remove the second aqueous solution by soaking the second treated surface in a water bath for 2 minutes. Ultrasound waves may also be applied to accelerate the rinsing step and speed the transport of unbound latex microparticles away from the second treated surface.

The bound polyethylenimine and latex microparticles may be present as a single layer in the final 3D printed article at a thickness of 8 µm such that a smoothness of the surface of the final 3D particle is higher than a smoothness of the surface of the initial 3D article. The single layer may act as a conformal coating that may grow evenly on the surface of the final 3D printed article. The treatment may be successively repeated to achieve a particular thickness for the conformal coating. For example, 2 treatments may be performed successively to achieve a conformal coating of 24 µm. In such an approach, the conformal coating may grow in thickness exponentially with a number of successive treatments rather than linearly, as the polyanions are not immobilized on binding with the anionic surface, and therefore may migrate inwards within the pores during the treatment to allow further polyanions to bind to the anionic surface.

There are various vehicles by which processes and/or systems and/or other technologies described herein may be effected (for example, hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

While various compositions, methods, systems, and devices are described in terms of "comprising" various components or steps (interpreted as meaning "including, but not limited to"), the compositions, methods, systems, and devices can also "consist essentially of" or "consist of" the various components and steps, and such terminology should be interpreted as defining essentially closed-member groups."

The foregoing detailed description has set forth various embodiments of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, some aspects of the embodiments disclosed herein, in whole or in part, may be equivalently implemented in integrated circuits, as one or more computer programs running on one or more computers (for example, as one or more programs running on one or more computer systems), as one or more programs running on one or more processors (for example as one or more programs running on one or more microprocessors), as firmware, or as virtually any combination thereof, and that designing the circuitry and/or writing the code for the software and or firmware would be possible in light of this disclosure.

The present disclosure is not to be limited in terms of the particular embodiments described in this application, which are intended as illustrations of various aspects. Many modifications and variations can be made without departing from its spirit and scope Functionally equivalent methods and apparatuses within the scope of the disclosure, in addition to those enumerated herein, will be possible from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, systems, or components, which can, of course, vary. It is also to be understood that the terminology used herein is for the purpose of describing particular embodiments only, and is not intended to be limiting.

In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (for example, a fiber optic cable, a waveguide, a wired communications link, a wireless communication link, etc.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that particular functionality is achieved. Hence, any two components herein combined to achieve a particular functionality may be seen as "associated with" each other such that the particular functionality is achieved, irrespective of architectures or intermediate components. Likewise, any two components so associated may also be viewed as being "operably connected", or "operably coupled", to each other to achieve the particular functionality, and any two components capable of being so associated may also be viewed as being "operably couplable", to each other to achieve the particular functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. A method to treat a surface of an initial three-dimensional (3D) printed article, the method comprising:
providing the initial 3D printed article that has an anionic surface;
treating the anionic surface with a first aqueous solution for a time period based on a first concentration of the first aqueous solution, wherein the first aqueous solution includes at least one polycation to produce a first treated surface; and
treating the first treated surface with a second aqueous solution for another time period based on a second concentration of the second aqueous solution, wherein the second aqueous solution includes at least one anionic microparticle to produce a final 3D printed article that has a second treated surface;
wherein:
the polycation binds to the anionic surface; and
the anionic microparticle binds to the polycation.

2. The method of claim 1, wherein the polycation is present in the final 3D printed article as a single layer that has thickness such that a smoothness of the surface of the final 3D printed article is higher than a smoothness of the surface of the initial 3D article.

3. The method of claim 1, further comprising:
heating the final 3D printed article to a temperature above a glass transition temperature ($T_g$) of the anionic microparticle.

4. The method of claim 3, wherein the surface of the final 3D printed article has a higher smoothness after the heating step than immediately before the heating step.

5. The method of claim 1, further comprising:
adding at least one titania particle, at least one polyionic dye, or both to the second aqueous solution prior to the second treatment step.

6. The method of claim 5, wherein the polyionic dye is a porphyrin dye or a phthalocyanine dye.

7. The method of claim 1, further comprising:
adding at least one silica particle to the second aqueous solution prior to the second treatment step.

8. The method of claim 7, wherein the final 3D printed article has a scratch resistance that is higher than a substantially identical final 3D printed article made without an addition of the at least one silica particle.

* * * * *